United States Patent Office 3,033,747
Patented May 8, 1962

3,033,747
17β-(DIHYDROXYPROPANOYL)-SUBSTITUTED STEROIDS
Ellis R. Pinson, Jr., Waterford, Eugene J. Agnello, Lyme, and Gerald D. Laubach, Niantic, Conn., assignors to Chas. Pfizer & Co., Inc., New York, N.Y., a corporation of Delaware
No Drawing. Filed May 11, 1960, Ser. No. 28,180
3 Claims. (Cl. 167—65)

This application is concerned with new and useful steroid compounds. More particularly it is concerned with certain steroids having adrenocortical activity characterized by having unique chemical features in the carbon atom side chain at the 17β-position. It is concerned also with a method of making these valuable compounds and with pharmaceutical compositions containing them together with pharmaceutically acceptable excipients.

The essence of this invention is the discovery that adrenocortically active steroids heretofore characterized by the presence of an α-hydroxy acetyl group at the 17β-position are also therapeutically useful when the α-hydroxy acetyl group is replaced with a dihydroxylated propanoyl group.

Adrenocortically active steroids now constitute a well-defined class in the art, and include therapeutically active agents having a wide range of applications in the medical field. Cortisone, hydrocortisone, prednisone, prednisolone, 2-methyl-prednisolone, 6-methyl-prednisolone, 16-methyl-prednisolone, 9α-fluoro-hydrocortisone and others have been found to be useful as systemic and topical anti-inflamatory agents and for other medical uses. They have for example been used in the treatment of rheumatoid diseases and allergies. They are pregnane derivatives having a cyclopentanopolyhydrophenanthrene nucleus. They generally have a double bond at the 4-position, a keto group at the 3-position and an oxygen function at the 11-position. Certain 9,11-dihalopregnene derivatives have adrenocortical activity. The compounds within the purview of this invention belong to the class of adrenocortically active steroids.

The compounds of this invention may be represented by the formula:

R—M wherein R is a cyclopentanopolyhydrophenanthrene nucleus characterized by having adrenocortical activity when substituted at the 17β-position with an α-hydroxy acetyl group and M is a dihydroxylated propanoyl group which replaces the 17β-(α-hydroxy acetyl) group.

As used in this application, the term "dihydroxylated propanoyl group" means a propanoyl group with hydroxyl groups on the α- and β-carbon atoms substituted at the 17β-position of a cyclopentanopolyhydrophenanthrene nucleus which has adrenocortical activity when substituted with a 17β-(α-hydroxy acetyl) group. It includes also compounds in which an hydroxyl group or groups in the propanoyl moiety is acylated with an acyl hydrocarbon group derived from mono- and dicarboxylic acids containing only carbon, hydrogen and oxygen up to a total of ten carbon atoms and the alkali metal and alkaline earth metal salts of the said dicarboxylic acids, as well as acetals and ketals formed by reaction of both hydroxyl groups with the carbonyl function of lower alkyl aldehydes and ketones. This latter class of compounds may be generically referred to as dioxolanes.

The preferred compounds within the purview of this invention include those having the formulas:

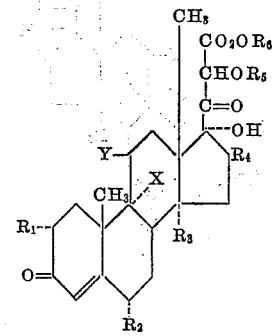

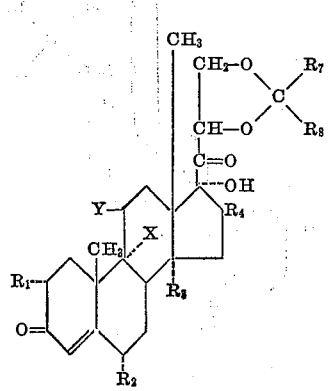

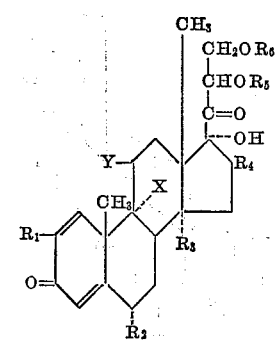

3

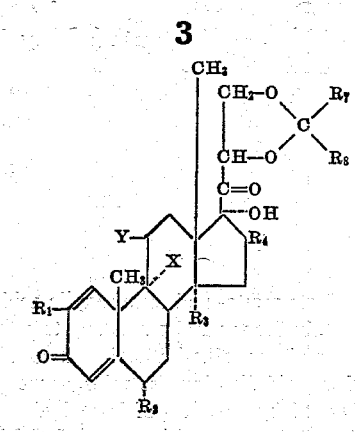

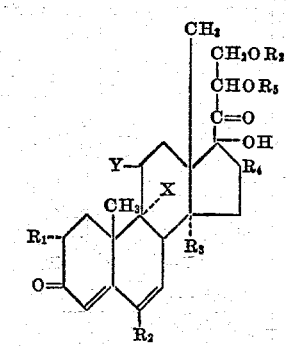

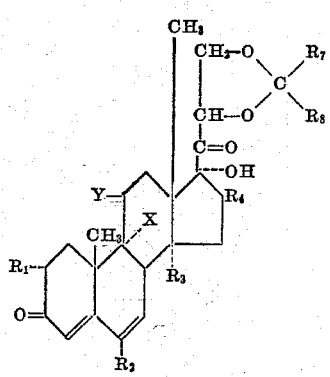

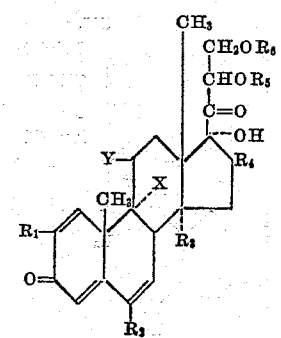

4 and

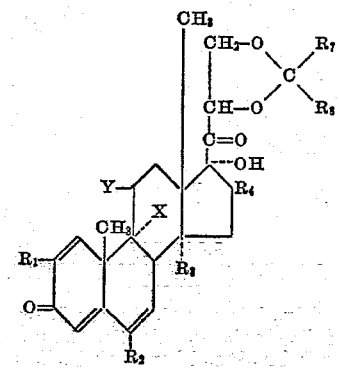

In the above structures, X is hydrogen, halogen, methoxy or ethoxy; Y is β-hydroxyl or keto; $R_1$ is hydrogen or methyl; $R_2$ is hydrogen, fluorine, chlorine or methyl; $R_3$ is hydrogen or hydroxyl; $R_4$ is

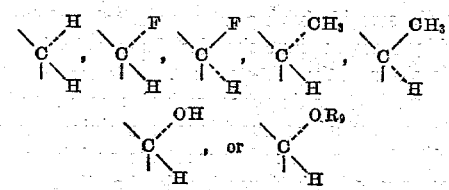

wherein $R_9$ is an acyl group; $R_5$ and $R_6$ are hydrogen or acyl, an acyl group wherever located containing only carbon, hydrogen and oxygen, being derived from mono- or dicarboxylic acids containing up to ten carbon atoms; and $R_7$ and $R_8$ which may be the same or different in a particular compound are hydrogen or lower alkyl each containing up to four carbon atoms except that both $R_7$ and $R_8$ cannot be hydrogen in a particular compound. In the preferred compounds represented above, the carbon atom at the sixteen position is always substituted with at least one hydrogen and at least three of $R_1$, $R_2$, $R_3$ and the second substituent on the number sixteen carbon atom will always be hydrogen. The water solubility of compounds derived from dicarboxylic acids is enhanced by conversion to alkali metal or alkaline earth metal salts by reaction with a suitable base such as sodium carbonate or calcium hydroxide. These salts are included within the purview of this invention.

Starting compounds which are useful in the preparation of the valuable compounds of this invention include those having the formula:

R—N wherein R has the same meaning as above and N, which is located at the 17β-position, is a propenoyl group.

Starting compounds useful for the preparation of the preferred compounds of this invention include those having structures identical with the ones shown above except that the substituent at the 17β-position is replaced with a propenoyl group. A typical starting compound is 21-methylene-Δ$^{1,4}$-pregnadiene-11β,17α-diol-3,20-dione, having the structure:

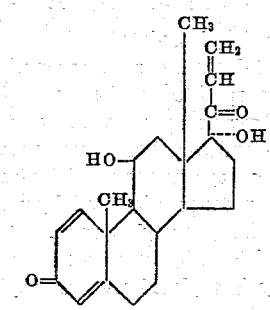

The starting materials are converted to the valuable compounds of this invention by reaction with osmium tetroxide. The desired result is best effected by reacting equimolar portions of steroid and oxidizing agent in a lower ether solvent containing up to eight carbon atoms at a temperature of from about 20 to about 30° C. for a period of from about sixteen to about seventy-two hours. An excess of osmium tetroxide say, for example, up to about a 20% molar excess can be used so as to insure complete reaction of the valuable steroid starting material although this is not necessary. Illustrative solvents include, for example, dioxane, diethyl ether, tetrahydrofuran, dimethyl ethylene glycol and other glycol ethers containing up to a total of eight carbon atoms. The preferred solvent is dioxane because of its good solubility characteristics with respect to both steroid and oxidizing agents. Further, it is readily removed by evaporation.

During the course of the reaction, an intermediate osmate ester precipitates and this is readily converted to a dihydroxy compound by known methods. It is possible, for example, to decompose the ester by treatment with various polyhydric compounds in alkaline solution, for example, mannitol in aqueous potassium hydroxide. In a preferred method, the osmate ester is decomposed by treatment with hydrogen sulfide. This reagent decomposes the ester and precipitates the osmium as a sulfide which is readily removed by filtration. The best yields are obtained if sufficient hydrogen sulfide is bubbled into the reaction mixture so as to form a saturated solution. The desired product is readily recovered from the filtrate by evaporation preferably in vacuo. It may be purified by recrystallization from a suitable solvent, for example, 1:1 ethyl acetate-methanol.

It will be noted by reference to the formulas set forth above that it is specifically intended to include within the purview of this invention not only compounds having free hydroxyl groups at the 16-position and the $\alpha$ and $\beta$-positions of the propanoyl moiety, but also these same compounds in which one or more of these groups is esterified with an acyl hydrocarbon group containing up to ten carbon atoms, that is, the group is an acylated hydroxyl group. Compounds of this nature are readily prepared by standard methods well known in the art. They are most simply prepared by mixing the reactants and allowing them to stand together for a period of time at from 20° C. to 30° C. The duration of the reaction will depend upon the reactivity of the acylating agent and with some acylating agents gentle heat may hasten reaction. Most conveniently, the acylating agent is an anhydride and the duration of the reaction is from eight to twenty-four hours. Using an anhydride, the reaction is best carried out in the presence of a basic reagent, suitably an amine. Pyridine is especially convenient because it is a liquid with excellent solubility characteristics. Often the pyridine can serve not only as the alkaline reagent but also as the solvent. Thus, the ester is formed by dissolving the steroid and the anhydride in pyridine and allowing the mixture to stand for from about eight to about twenty-four hours. Of course, other solvents well known to those skilled in the art may be successfully employed.

Most often the acylated hydroxyl groups will be identical, but it is possible to prepare compounds within the purview of this invention in which the groups are dissimilar. For example, one can utilize a starting propenoyl compound in which the hydroxyl group at the sixteen position is already acylated, and subsequently acylate the two hydroxyl groups in the $\alpha$ and $\beta$-positions in the propanoyl moiety with another acylating agent. Since the hydroxyl group at the $\alpha$-position is a secondary hydroxyl group and the one in the $\beta$-position is primary they may be acylated, as is well known, independently of each other.

Free alcohols are formed from the corresponding esters by gentle hydrolysis, for example, with dilute hydrogen chloride in aqueous methanol or with potassium carbonate in aqueous methanol. Since the rate at which esters formed from primary and secondary alcohols may be hydrolyzed varies considerably, this hydrolysis reaction may be utilized to form compounds in which there are diverse acyl hydrocarbon groups at the various positions.

The term "acylated hydroxyl group" include those groups derived from mono and dicarboxylic acids containing only carbon, hydrogen and oxygen up to a total of ten carbon atoms. In the event that the group is derived from a dicarboxylic acid, it is often advantageous to treat a therapeutically active compound with a base derived from an alkali metal or alkaline earth metal to prepare a metal salt. These bases include, for example, sodium, potassium, barium and calcium hydroxide as well as the corresponding carbonates and bicarbonates. Products so prepared are especially useful because of their increased solubility in water.

Those skilled in the art will recognize that the number 2-carbon atom, i.e., the $\alpha$-carbon atom, in the propanoyl moiety is asymmetric and that, therefore, the compounds within the purview of this invention exist as optical isomers. It is intended to include both isomers within the purview of the invention. It is possible to separate the isomers, for example, by chromatography, but it is not necessary to do so since both are active. For most therapeutic purposes, therefore, it is immaterial whether a pure optical isomer or a mixture is used.

If it is desired to separate the isomers this can be readily accomplished by paper chromatography according to means well known in the art. For example, the free alcohols can be separated on paper using chloroform as the mobile phase and formamide as the stationary phase. The esters can be separated using a 1:3 mixture of chloroform and benzene as the mobile phase and formamide as the stationary phase. Each product may be isolated by dissolving it from the paper using a suitable solvent such as ethyl acetate or chloroform.

The biologically active compounds of this invention may be administered alone or in combination with acceptable pharmaceutical carriers, the choice of which is determined by the preferred route of administration, the solubility of the compound and standard pharmaceutical practice. In general, the dosage of these compounds is of approximately the same order of magnitude as the dosages of hydrocortisone, and these compounds are useful to treat the types of pathological conditions often treated with hydrocortisone. Because of their great adrenocortical activity, it is sometimes possible to use dosages of these compounds which are lower than those of hydrocortisone.

For oral administration, the compounds may be administered in the form of tablets containing excipients such as starch or milk sugar. Aqueous suspensions and elixirs which may be sweetened or flavored may also be used. To apply these therapeutic agents topically, they may be prepared in the form of ointments and salves in suitable bases especially non-aqueous petrolatum type bases. For intro-articular injection aqueous suspensions may be employed. In this case various suspending and wetting agents may be added to the compositions to obtain a suspension not tending to settle out easily or to pack down in the bottle in which it is stored. Intramuscular and subcutaneous dosage forms may also be prepared by standard pharmaceutical practice.

The synthetic scheme set forth below illustrates the preparation of 9$\alpha$-fluoro-21-hydroxymethyl-$\Delta^4$-pregnene-11$\beta$,17$\alpha$,21-triol-3,20-dione, one of the compounds of this invention. It exemplifies also the general method by which the compounds of this invention are prepared.

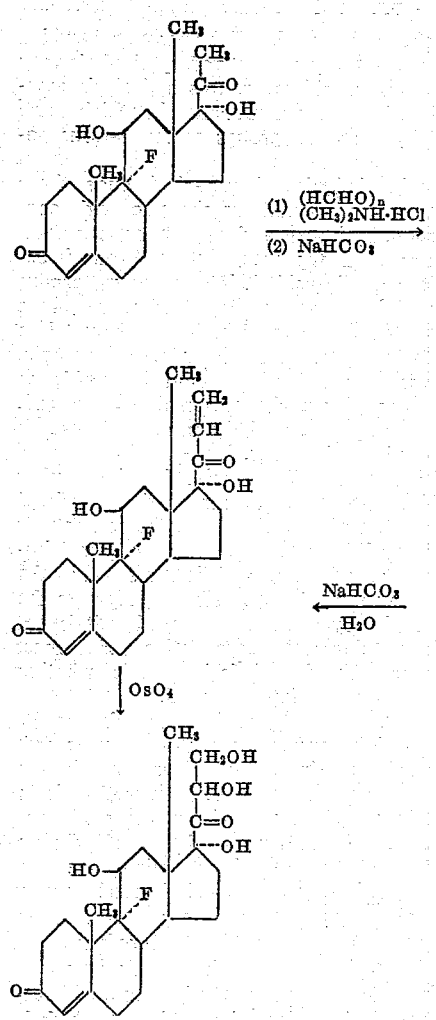
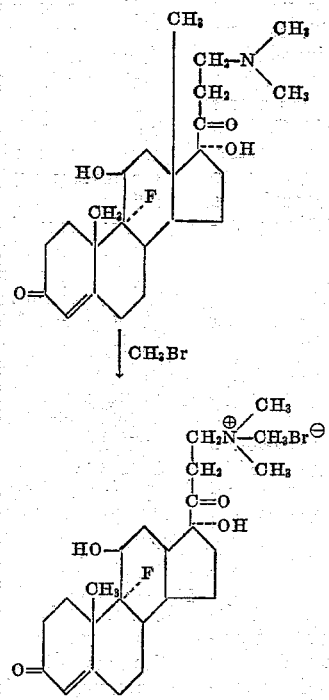

The acetonides within the purview of this invention are prepared by procedures well known to those skilled in the art. They may be prepared, for example, by the procedure described by Woodward et al. in the Journal of the American Chemical Society, vol. 74, page 4241 (1952). In this procedure, the steroid compound is taken up in the carbonyl compound, for example, acetone, methyl ethyl ketone or di-n-butyl ketone which has been dried over a suitable drying agent such as anhydrous potassium carbonate. Anhydrous copper sulfate is added and the mixture agitated for from about 24 to about 48 hours. The mixture is then filtered and the desired product recovered, for example, by removal of the solvent in vacuo. Other methods of forming acetals and ketals are also applicable. For example, the steroid may be taken up in the liquid aldehyde or ketone and refluxed in the presence of a catalytic amount of a mineral acid such as concentrated hydrochloric acid, for from about 1 to about 10 minutes. The desired product is precipitated by the addition of water.

The preparation of the quaternary alkyl ammonium bromide is described and the product is claimed in copending and concurrently filed patent application, Serial No. 28,178. This application describes the preparation of a tertiary amine acid addition salt by reaction of a 21-desoxy steroid with formaldehyde and an amine acid addition salt at a temperature of from about 90° C. to about 140° C. for from about 2 to about 24 hours in an alkanol solvent containing up to five carbon atoms. The steroid acid addition salt is converted to a free base by neutralization with an acid reagent such as aqueous sodium bicarbonate and then transformed into a quaternary compound by reaction with an alkyl halide in accordance with procedures well known in the art.

The conversion of the quaternary compound to a propenoyl compound is described and claimed in copending and concurrently filed patent application, Serial No. 28,179 which also claims the products. The conversion is effected by maintaining the quaternary compound in an aqueous solution at a pH of from about 7 to about 12 at a temperature of from about 20° C. to about 30° C. for a period of from about 1 to about 6 hours.

The following examples are given solely for the purpose of illustration and are not to be construed as limitations of this invention, many variations of which are possible without departing from the spirit or scope thereof.

EXAMPLE I

21-Hydroxymethyl-$\Delta^{1,4}$-Pregnadiene-11β,17α,21-Triol-3,20-Dione

A mixture containing 1.4 g. of 21-methylene-$\Delta^{1,4}$-pregnadiene-11β,17α-diol-3,20-dione (prepared as described in copending and concurrently filed patent application Serial No. 28,179) and 1.00 g. of osmium tetroxide in 50 ml. of dioxane was allowed to stand at 25° C. for 48 hours. The mixture was filtered and the filtrate saturated with hydrogen sulfide. The saturated filtrate was allowed to stand for ½ hour and filtered. The solvent was removed in vacuo and the residue recrystallized twice from 1:1 ethyl acetate-methanol mixture.

$\lambda$ max.=243 mμ, $\epsilon$=14,700. Calculated for $C_{22}H_{30}O_6$. C=67.67; H=7.75. Found: C=67.54; H=8.10.

EXAMPLE II

*21-Hydroxymethyl-Δ⁴-Pregnene-11β,17α,21-Triol-3,20-Dione*

A mixture containing equimolar quantities of osmium tetroxide and 21 - methylene - Δ⁴ - pregnene-11β,17α-diol-3,20-dione in 50 ml. of dibutyl ether was allowed to stand for 72 hours at 20° C. The mixture was filtered and the filtrate saturated with hydrogen sulfide. The hydrogen sulfide saturated filtrate was allowed to stand for 1 hour and the back precipitate removed by filtration. The solvent was removed in vacuo to yield the desired product as a residue.

EXAMPLE III

*21-Hydroxymethyl-Δ¹,⁴,⁶-Pregnatriene-11β,17α,21-Triol-3,20-Dione*

A mixture containing 21-methylene-Δ¹,⁴,⁶-pregnatriene-11β,17α-diol-3,20-dione together with a 20% molar excess of osmium tetroxide in 75 ml. of tetrahydrofuran was allowed to stand at 30° C. for 16 hours. The mixture was filtered and the filtrate saturated with hydrogen sulfide. The hydrogen sulfide saturated filtrate was filtered and the solvent removed in vacuo to yield the desired product as a residue.

EXAMPLE IV

*2-Methyl-21-Hydroxymethyl-Δ¹,⁴-Pregnadiene-11β,17α,21-Triol-3,20-Dione*

A mixture containing 1.4 g. of 2-methyl-21-methylene-Δ¹,⁴-pregnadiene-11β,17α-diol-3,20-dione (prepared as described in copending and concurrently filed patent application Serial No. 28,179) and 1.00 g. of osmium tetroxide in 50 ml. of dioxane was allowed to stand at 25° C. for 48 hours. The mixture was filtered and the filtrate saturated with hydrogen sulfide. The saturated filtrate was allowed to stand for ½ hour and filtered. The solvent was removed in vacuo and the residue recrystallized twice from 1:1 ethyl acetate-methanol mixture.

EXAMPLE V

*6α-Chloro-21-Hydroxymethyl-Δ⁴-Pregnene-11β,17α,21-Triol-3,20-Dione*

A mixture containing equimolar quantities of osmium tetroxide and 6α-fluoro - 21 - methylene-Δ⁴-pregnene-11β,17α-diol-3,20-dione in 50 ml. of dibutyl ether was allowed to stand for 72 hours at 20° C. The mixture was filtered and the filtrate saturated with hydrogen sulfide. The hydrogen sulfide saturated filtrate was allowed to stand for 1 hour and the black precipitate removed by filtration. The solvent was removed in vacuo to yield the desired product as a residue.

EXAMPLE VI

*16α-Methyl-21-Hydroxymethyl-Δ¹,⁴-Pregnadiene-11β,17α,21-Triol-3,20-Dione*

A mixture containing 16α-methyl-21-methylene-Δ¹,⁴-pregnadiene-11β,17α-diol-3,20-dione together with a 20% molar excess of osmium tetroxide in 75 ml. of tetrahydrofuran was allowed to stand at 30° C. for 16 hours. The mixture was filtered and the filtrate saturated with hydrogen sulfide. The hydrogen sulfide saturated filtrate was filtered and the solvent removed in vacuo to yield the desired product as a residue.

EXAMPLE VII

*16β-Methyl-21-Hydroxymethyl-Δ¹,⁴-Pregnadiene-11β,17α,21-Triol-3,20-Dione*

A mixture containing 16α-methyl-21-methylene-Δ¹,⁴-pregnadiene-11β,17α-diol-3,20-dione together with a 20% molar excess of osmium tetroxide in 75 ml. of tetrahydrofuran was allowed to stand at 30° C. for 16 hours. The mixture was filtered and the filtrate saturated with hydrogen sulfide. The hydrogen sulfide saturated filtrate was filtered and the solvent removed in vacuo to yield the desired product as a residue.

EXAMPLE VIII

*21-Hydroxymethyl-Δ⁴-Pregnene-16α,17α,21-Triol-3,11,20-Trione 16-Acetate*

A mixture containing 1.4 g. of 21-methylene-Δ⁴-pregnene-16α,17α-diol-3,20-dione 16-acetate (prepared as described in copending and concurrently filed patent application Serial No. 28,179) and 1.00 g. of osmium tetroxide in 50 ml. of dioxane was allowed to stand at 25° C. for 48 hours. The mixture was filtered and the filtrate saturated with hydrogen sulfide. The saturated filtrate was allowed to stand for ½ hour and filtered. The solvent was removed in vacuo and the residue recrystallized twice from 1:1 ethyl acetate-methanol mixture.

The following list sets forth some of the compounds within the purview of this invention prepared by the procedures set forth in the foregoing examples. The list is given to avoid unnecessary repetition of experimental details.

21-hydroxymethyl-Δ¹,⁴-pregnadiene-11β,14α,17α,21-tetrol-3,20-dione

6α-fluoro-21-hydroxymethyl-Δ⁴-pregnene-11β,17α,21-triol-3,20-dione

6α-fluoro-21-hydroxymethyl-Δ⁴-pregnene-17α,21-diol-3,11,20-trione

6α-fluoro-9α-bromo-21-hydroxymethyl-Δ⁴-pregnene-11β,17α,21-tetrol-3,20-dione

6α,9α-difluoro-21-hydroxymethyl-Δ⁴-pregnene-11β,17α,21-triol-3,20-dione

6α-fluoro-21-hydroxymethyl-Δ¹,⁴-pregnadiene-11β,17α,21-triol-3,20-dione

6α-fluoro-9α-bromo-21-hydroxymethyl-Δ¹,⁴-pregnadiene-11β,14α,17α,21-tetrol-3,20-dione 6α,9α-difluoro-21-hydroxymethyl-Δ¹,⁴-pregnadiene-11β,17α,21-triol-3,20-dione 6α,9α-difluoro-21-hydroxymethyl-Δ¹,⁴-pregnadiene-17α,21-diol-3,11,20-trione 6α,9α-difluoro-21-hydroxymethyl-Δ⁴-pregnene-17α,21-diol-3,11,20-trione 6α-fluoro-9α-chloro-21-hydroxymethyl-Δ⁴-pregnene-11β,17α,21-triol-3,20-dione 6α-fluoro-9α-chloro-21-hydroxymethyl-Δ⁴-pregnene-17α,21-diol-3,11,20-trione 6α-fluoro-9α-bromo-21-hydroxymethyl-Δ⁴-pregnene-17α,21-diol-3,11,20-trione 6α-fluoro-9α-chloro-21-hydroxymethyl-Δ¹,⁴-pregnadiene-17α,21-diol-3,11,20-trione 6α-fluoro-9α-bromo-21-hydroxymethyl-Δ¹,⁴-pregnadiene-17α,21-diol-3,11,20-trione 6α-fluoro-21-hydroxymethyl-Δ⁴-pregnene-17α,21-diol-3,11,20-trione 6α-fluoro-21-hydroxymethyl-Δ¹,⁴-pregnadiene-17α,21-diol-3,11,20-trione 6α-fluoro-21-hydroxymethyl-Δ⁴-pregnadiene-11β,16α,21-triol-3,20-dione 6α-fluoro-21-hydroxymethyl-Δ⁴-pregnadiene-11β,16α,17α,21-tetrol-3,20-dione 6α-fluoro-21-hydroxymethyl-Δ⁴-pregnene-16α,17α,21-triol-3,11,20-trione 6α-fluoro-21-hydroxymethyl-Δ¹,⁴-pregnadiene-11β,16α,17α,21-tetrol-3,20-dione 6α-fluoro-21-hydroxymethyl-Δ¹,⁴-pregnadiene-16α,17α,21-triol-3,11,20-trione 6α-methyl-9α-fluoro-21-hydroxymethyl-Δ¹,⁴-pregnadiene-11β,17α,21-triol-3,20-dione 6α-methyl-9α-bromo-21-hydroxymethyl-Δ¹,⁴-pregnadiene-11β,17α,21-triol-3,20-dione 6α-methyl-9α-fluoro-21-hydroxymethyl-Δ⁴-pregnene-11β,17α,21-triol-3,20-dione
6α-methyl-9α-bromo-21-hydroxymethyl-Δ⁴-pregnene-11β,17α,21-triol-3,20-dione
2α-methyl-21-hydroxymethyl-Δ⁴-pregnene-17α,21-diol-3,11,20-trione
2α-methyl-9α-bromo-21-hydroxymethyl-Δ⁴-pregnene-11β,17α,21-triol-3,20-dione
2α-methyl-9α-fluoro-21-hydroxymethyl-Δ⁴-pregnene-11β,17α,21-triol-3,20-dione
2α-methyl-9α-fluoro-21-hydroxymethyl-Δ⁴-pregnene-17α,21-diol-3,11,20-trione
21-hydroxymethyl-Δ$^{1,4,6}$-pregnatriene-11β,17α,21-triol-3,20-dione
21-hydroxymethyl-Δ$^{4,6}$-pregnadiene-11β,14α,17α,21-tetrol-3,20-dione
21-hydroxymethyl-Δ$^{4,6}$-pregnadiene-14α,17α,21-triol-3,11,20-trione
21-hydroxymethyl-Δ$^{4,6}$-pregnadiene-11β,17α,21-triol-3,20-dione
21-hydroxymethyl-Δ$^{1,4,6}$-pregnatriene-11β,14α,21-tetrol-3,20-dione
16α-methyl-21-hydroxymethyl-Δ$^{4,6}$-pregnadiene-11β,17α,21-triol-3,20-dione
16β-methyl-21-hydroxymethyl-Δ$^{4,6}$-pregnadiene-11β,17α,21-triol-3,20-dione
16α-methyl-9α-bromo-21-hydroxymethyl-Δ$^{4,6}$-pregnadiene-11β,17α,21-triol-3,20-dione
16β-methyl-9α-bromo-21-hydroxymethyl-Δ$^{4,6}$-pregnadiene-11β,17α,21-triol-3,20-dione
16α-methyl-9α-fluoro-21-hydroxymethyl-Δ$^{4,6}$-pregnadiene-11β,17α,21-triol-3,20-dione
16β-methyl-9α-fluoro-21-hydroxymethyl-Δ$^{4,6}$-pregnadiene-11β,17α,21-triol-3,20-dione
16α-methyl-9α-fluoro-21-hydroxymethyl-Δ$^{1,4,6}$-pregnatriene-11β,17α,21-triol-3,20-dione
6-methyl-21-hydroxymethyl-Δ$^{4,6}$-pregnadiene-11β,17α,21-triol-3,20-dione
6-methyl-21-hydroxymethyl-Δ$^{1,4,6}$-pregnatriene-11β,17α,21-triol-3,20-dione
6-methyl-21-hydroxymethyl-Δ$^{4,6}$-pregnadiene-17α,21-diol-3,11,20-trione
6-methyl-21-hydroxymethyl-Δ$^{1,4,6}$-pregnatriene-17α,21-diol-3,11,20-trione
9α-fluoro-21-hydroxymethyl-Δ$^{4,6}$-pregnadiene-11β,17α,21-triol-3,20-dione
9α-chloro-21-hydroxymethyl-Δ$^{4,6}$-pregnadiene-11β,17α,21-triol-3,20-dione
9α-bromo-21-hydroxymethyl-Δ$^{4,6}$-pregnadiene-11β,17α,21-triol-3,20-dione
9α-iodo-21-hydroxymethyl-Δ$^{4,6}$-pregnadiene-11β,17α,21-triol-3,20-dione
9α-methoxy-21-hydroxymethyl-Δ$^{4,6}$-pregnadiene-11β,17α,21-triol-3,20-dione
9α-ethoxy-21-hydroxymethyl-Δ$^{4,6}$-pregnadiene-11β,17α,21-triol-3,20-dione
9α-fluoro-21-hydroxymethyl-Δ$^{4,6}$-pregnadiene-17α,21-diol-3,11,20-trione
9α-chloro-21-hydroxymethyl-Δ$^{4,6}$-pregnadiene-17α,21-diol-3,11,20-trione
9α-bromo-21-hydroxymethyl-Δ$^{4,6}$-pregnadiene-17α,21-diol-3,11,20-trione
9α-iodo-21-hydroxymethyl-Δ$^{4,6}$-pregnadiene-17α,21-diol-3,11,20-trione
9α-methoxy-21-hydroxymethyl-Δ$^{4,6}$-pregnadiene-17α,21-diol-3,11,20-trione
9α-ethoxy-21-hydroxymethyl-Δ$^{4,6}$-pregnadiene-17α,21-diol-3,11,20-trione
9α-fluoro-21-hydroxymethyl-Δ$^{1,4,6}$-pregnatriene-11β,17α,21-triol-3,20-dione
6-methyl-9α-fluoro-21-hydroxymethyl-Δ$^{1,4,6}$-pregnatriene-11β,17α,21-triol-3,20-dione
6-methyl-9α-bromo-21-hydroxymethyl-Δ$^{1,4,6}$-pregnatriene-11β,17α,21-triol-3,20-dione
6-methyl-9α-fluoro-21-hydroxymethyl-Δ$^{4,6}$-pregnadiene-11β,17α,21-triol-3,20-dione
6-methyl-9α-bromo-21-hydroxymethyl-Δ$^{4,6}$-pregnadiene-11β,17α,21-triol-3,20-dione
2α-methyl-21-hydroxymethyl-Δ$^{4,6}$-pregnadiene-11β,17α,21-triol-3,20-dione
2α-methyl-21-hydroxymethyl-Δ$^{4,6}$-pregnadiene-17α,21-diol-3,11,20-trione
2α-methyl-9α-bromo-21-hydroxymethyl-Δ$^{4,6}$-pregnadiene-11β,17α,21-triol-3,20-dione
2α-methyl-9α-fluoro-21-hydroxymethyl-Δ$^{4,6}$-pregnadiene-11β,17α,21-triol-3,20-dione
2α-methyl-9α-fluoro-21-hydroxymethyl-Δ$^{4,6}$-pregnadiene-17α,21-diol-3,11,20-trione
6α-chloro-21-hydroxymethyl-Δ⁴-pregnene-11β,17α,21-triol-3,20-dione
6α,9α-dichloro-21-hydroxymethyl-Δ$^{1,4}$-pregnadiene-17α,21-diol-3,11,20-trione
16α-fluoro-21-hydroxymethyl-Δ⁴-pregnene-11β,17α,21-triol-3,20-dione
9α,16β-difluoro-21-hydroxymethyl-Δ$^{1,4}$-pregnadiene-11β,17α,21-triol-3,20-dione
16β-fluoro-21-hydroxymethyl-Δ⁴-pregnene-17α,21-diol-3,11,20-trione A variety of mono-, di- and triesters of the foregoing α- and β-propanoyl compounds, including the 16-hydroxylated compounds, were prepared in accordance with standard methods. These include the acetates, propanoates, propenoates, octanoates, benzoates, cyclohexanoates, decanoates, butenoates, hemiglutarates and hemisuccinates. In the case of acid esters, the compounds were converted to alkali metal or alkaline earth metal salts by reaction with a suitable base such as sodium or barium hydroxide.

Compounds within the purview of this invention having an 11-keto substituent are prepared by oxidation of the corresponding 11-hydroxylated compounds or by using 11-keto compounds as starting materials. In the event that the final product is to be oxidized, it is best to protect other hydroxyl groups by esterification prior to oxidation. To do otherwise may lead to a mixture of products as a result of simultaneous oxidation of labile hydroxyl groups. The oxidation is effected according to means well known in the art including, for example, oxidation with chromium trioxide or the chromic acid-pyridine complex.

PREPARATION OF ACETALS AND KETALS

The following example is illustrative of two of the methods which are used to prepare the carbonyl derivatives of this invention, including those prepared from the compounds of the previous examples. Those prepared by these methods include the acetals and ketals from acetaldehyde, propionaldehyde, butyraldehyde, acetone, di-isopropyl ketone, methyl ethyl ketone and di-n-butyl ketone.

21 - hydroxymethyl - Δ$^{1,4}$ - pregnadiene - 11β,17α,21-triol-3,20-dione (100 mg.) was taken up in 100 ml. of acetone which had been previously dried over anhydrous potassium carbonate. To this mixture there was added 495 mg. of anhydrous copper sulfate and the mixture was stirred at room temperature for two days. The mixture was filtered, dried over anhydrous potassium carbonate, again filtered and the excess solvent removed in vacuo. The residue was triturated with ether containing a few drops of acetone and the desired product recovered by filtration.

9α - fluoro - 21 - hydroxymethyl - Δ$^{1,4}$ - pregnadiene (350 mg.) was taken up in 25 ml. of propionaldehyde containing two drops of concentrated hydrochloric acid. The mixture was refluxed for 5 minutes and allowed to stand at room temperature for eight hours. The desired product was precipitated by the addition of water and isolated by filtration.

What is claimed is:
1. A compound selected from the group consisting of those having the formulae:

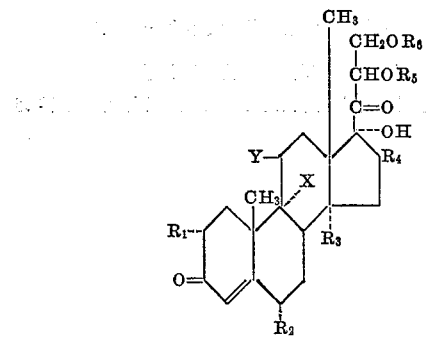
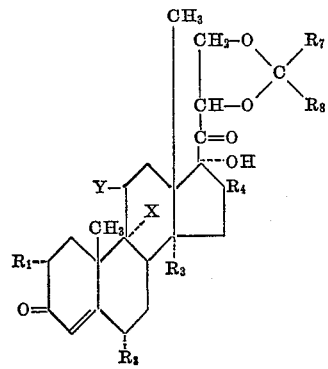
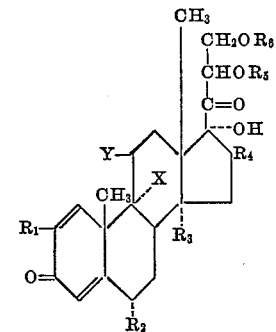
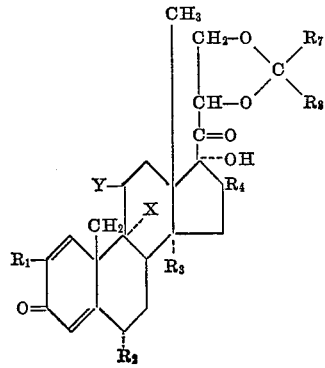
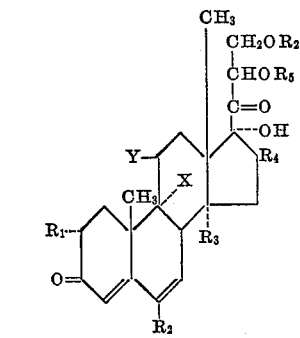
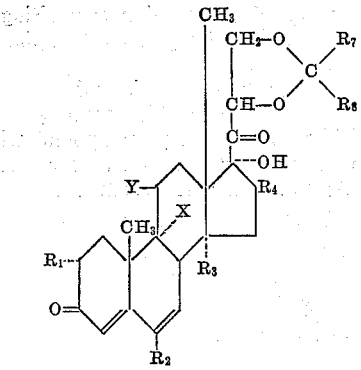
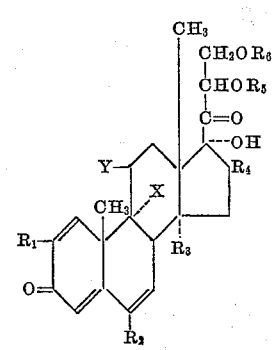
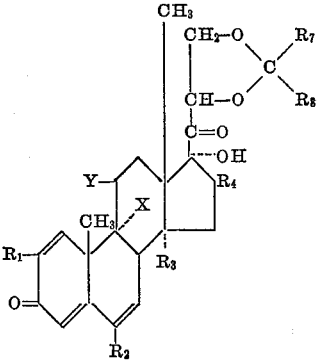

and

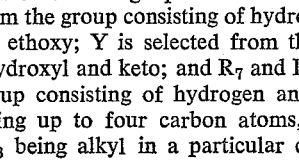

wherein $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; $R_4$ is selected from the group consisting of

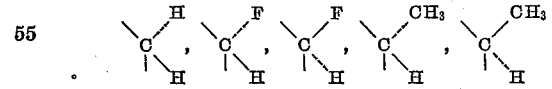

and

$R_5$, $R_6$ and $R_9$ are selected from the group consisting of hydrogen and acyl groups containing only carbon, hydrogen and oxygen and derived from mono- and dicarboxylic acids containing up to ten carbon atoms; X is selected from the group consisting of hydrogen, halogen, methoxy and ethoxy; Y is selected from the group consisting of β-hydroxyl and keto; and $R_7$ and $R_8$ are selected from the group consisting of hydrogen and lower alkyl each containing up to four carbon atoms, at least one of $R_7$ and $R_8$ being alkyl in a particular compound.

2. A pharmaceutical composition comprising a compound as claimed in claim 1 together with a pharmaceutically acceptable carrier.

3. In a process for the preparation of a compound as claimed in claim 1 the steps which comprise contacting the corresponding 17β-propenoyl compound with osmium tetroxide in a lower ether solvent containing up to eight carbon atoms at a temperature of from about 20° C. to about 30° C. for a period of from about 16 to about 72 hours and decomposing resulting osmate ester by reaction with hydrogen sulfide.

References Cited in the file of this patent

UNITED STATES PATENTS 2,389,325     Reichstein _____ Nov. 20, 1945